No. 878,239. PATENTED FEB. 4, 1908.
L. RUBACH.
HYDRAULIC RAM.
APPLICATION FILED OCT. 10, 1907.
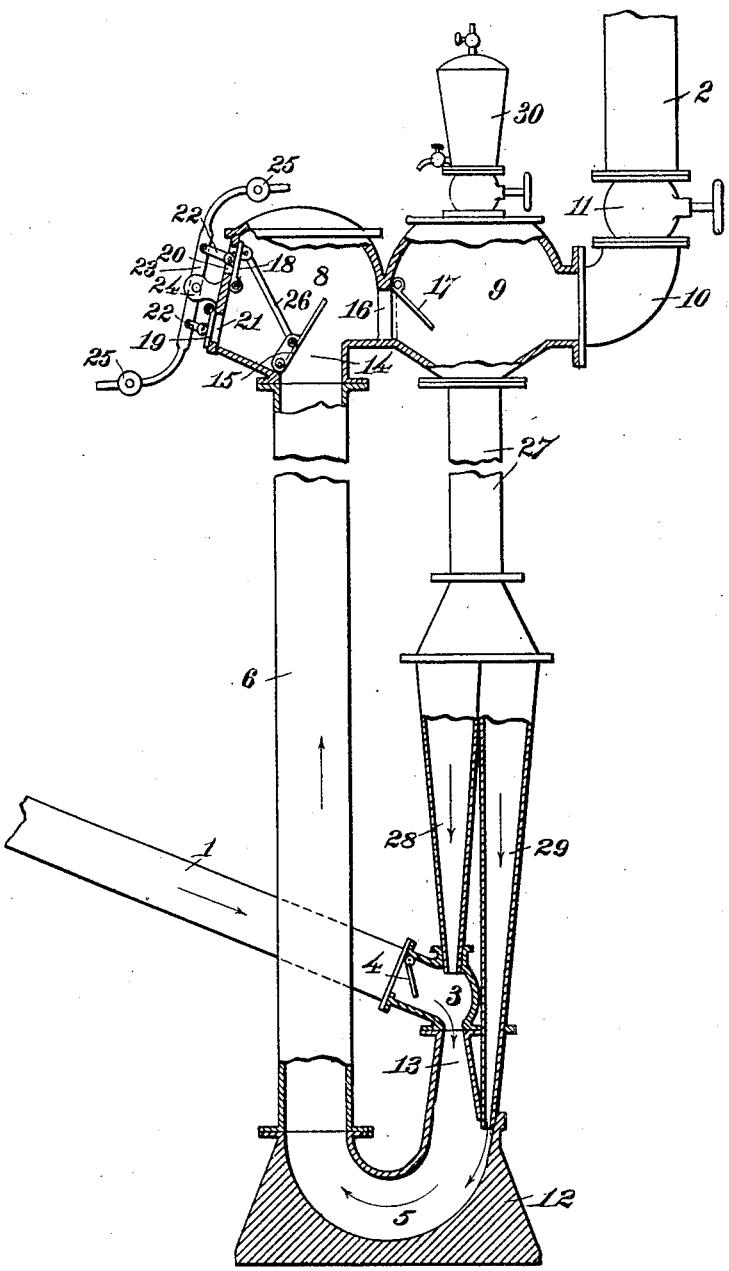
Witnesses:
J. T. Austin
F. E. Sheehy
Inventor:
Leopold Rubach,
by
Joshua R. H. Potts,
Atty.

UNITED STATES PATENT OFFICE.

LEOPOLD RUBACH, OF SOUTH CHICAGO, ILLINOIS.

HYDRAULIC RAM.

No. 878,239.  Specification of Letters Patent.  Patented Feb. 4, 1908.

Application filed October 10, 1907. Serial No. 396,719.

*To all whom it may concern:*

Be it known that I, LEOPOLD RUBACH, a subject of the Emperor of Germany, residing in South Chicago, county of Cook and State of Illinois, have invented certain new and useful Improvements in Hydraulic Rams, of which the following is a specification.

My invention relates to hydraulic rams, that is, to devices for raising water from one level to another at a greater height, with no other power than that afforded by the inertia of a moving column of water.

The object of my invention is to provide a hydraulic ram by means of which water may be lifted to an indefinite height and that with but a small original "head".

A further object is to provide a device as mentioned which will operate with less waste of water than those now generally in use.

Further objects will appear hereinafter.

Primarily, my invention consists in utilizing the "head" of water in the delivery pipe for originating or creating the stroke necessary for drawing in fresh water and injecting or forcing it into the delivery pipe.

My invention further consists in an apparatus operating upon the principle mentioned, and in various details of construction and arrangements of parts all as will be fully described hereinafter and particularly pointed out in the claims.

My invention will be more readily understood by reference to the accompanying drawing forming a part of this specification and in which, the figure represents the side elevation of an apparatus embodying my invention in its preferred form, portions of the apparatus being illustrated in section.

The drawing represents the preferred form of an apparatus for carrying out my invention, and consists generally in a supply pipe, a delivery pipe, a chamber into which the supply pipe discharges through a valved port, a passageway connecting said chamber with the delivery pipe, means for injecting the water from the discharge pipe into said chamber and said passageway under the head of water in the delivery pipe, means for cutting off a portion of said passageway and means for automatically varying the pressure of water in the portion cut off, to maintain a proper circulation in the apparatus.

Referring to the drawing, 1 indicates the inlet or supply pipe from the source of supply, and 2 the delivery pipe leading to a tank or other place to which the water is to be delivered. The pipe, 1 discharges into a chamber, 3 and the entrance of water into said chamber is controlled by a valve 4, which automatically closes when the pressure in the chamber 3 exceeds the pressure in the pipe, 1. The chamber, 3, is connected with the delivery pipe by a suitable passageway which comprises the U shaped portion, 5, the vertical portion, 6 and the chambers, 8 and 9 the latter of which discharges into the delivery pipe through the elbow, 10 and valve, 11. The U shaped portion, 5 is preferably formed in the base member, 12 and the portion, 13 to which the chamber, 3 is connected is preferably formed conically, as shown. The portion, 6 comprises a vertical pipe rising from the opposite end of the U shaped portion from that to which the chamber, 3 is connected, and discharging into the bottom of the chamber, 8 through a port, 14.

15 indicates a valve controlling the port, 14. The chamber, 9 is preferably arranged directly above the chamber, 3 and communicates with the chamber, 8 through a port, 16 controlled by a valve, 17 which closes when the pressure in the chamber, 8 drops below that in the chamber, 9 and the delivery pipe. The chamber, 8 is the portion of the passageway from the chamber, 3 to the delivery pipe, which is cut off automatically, and suitable means are provided for reducing the pressure in the chamber, 8 at such times. This consists in a pair of valves 18 and 19 which control their respective ports, 20 and 21. These are connected by rods, or pitmen 22 to a rock-lever, 23 pivoted in a bracket, 24 upon the outside of the chamber, 8 and between the ports, 20 and 21. The valves, 18 and 19 are of equal area and the former opens inwardly whereas the latter opens outwardly, hence no matter how great the pressure in the chamber, 8, the pressure on one valve equalizes the pressure on the other. Therefore, little or no force is required to open or close said valve.

25—25 indicate weights adjustably secured to the curved ends of the lever, 23 and by means of which, the lever and the valves may be nicely balanced. The valve, 18 is connected by a pitman, 26 to the valve, 15, hence, as the valve, 15 closes, the valves, 18 and 19 are opened.

Depending from the bottom of the chamber, 9 is a pipe 27 terminating in the coincal injectors or nozzles, 28 and 29 which discharge into the chamber, 3 and into the portion, 5 of the passageway respectively. It should be noted that the water in the nozzles, 28 and 29 is under constant pressure due to the head of water in the delivery pipe, 2. The water entering the chamber, 3 through the nozzle, 28 entrains the water therein and injects it into the portion, 5 and the pipe, 6, and, the water entering tangentially into the portion, 5 from the nozzle, 29 increases the pressure in the passageway. As the water is injected from the chamber, 3 into the passageway the valve 4 is opened by suction admitting more water. The water rises through the pipe 6 and past the valve, 15 which it opens into the chamber, 8, and from thence passes through the passageway, 16 into the chamber, 9 and the delivery pipe, 2. As soon as the pressure in the chamber, 8 balances the pressure in the pipes, 27 and 6, the valve, 15 closes by gravity. This opens the valves 18 and 19 permitting the water to escape from the chamber, 8. This reduces the pressure in said chamber and the back pressure in the chamber, 9 closes the valve, 17. The head of water in the pipe, 2 continues to force the water through the nozzles, 28 and 29 again increasing the pressure in the portions, 5 and 6, as before described, until the pressure in said portions is sufficient to open the valve, 15. This closes the valves, 18 and 19 forcing the water through the passageway, 16 past the valve, 17 into the chamber, 9 and pipe, 2. As soon as the pressure in the chamber, 8 equalizes the pressure in the pipe, 6 the valve 15 closes, opening the valves, 18 and 19 and closing the valve, 17, repeating the process indefinitely.

It is obvious that but little head or pressure is necessary in the pipe, 1 as the water is drawn in and forced into the system and kept in circulation herein by pressure due to the head of water in the pipe, 2. Further but little water is wasted in comparison with other hydraulic rams, as but little water escapes through the ports, 20 and 21 before the pressure in the chamber, 8 is reduced to such an extent as to permit the valve, 15 to open which closes the valve, 18 and 19 preventing further escape of water.

30 indicates an air chamber arranged above and in communication with the chamber, 9. This serves the same purpose as the usual air chamber on hydraulic rams namely, to cushion the shock to the apparatus and to maintain a more constant flow in the pipe, 2.

Having described my invention what I claim as new and desire to secure by Letters Patent is:—

1. In a device of the class described, an inlet pipe and a delivery pipe, in combination with a passageway connecting said inlet and said delivery pipes, means for injecting water into said passageway under pressure due to the head of water in the delivery pipe and means for automatically varying the pressure in said passageway as and for the purpose specified.

2. In a device of the class described, an inlet pipe and a delivery pipe in combination with a passageway connecting said pipe, means for injecting water into said passageway under pressure due to the head of water in the delivery pipe, means for automatically cutting off a portion of said passageway and means for varying the pressure in said portion, substantially as and for the purpose specified.

3. In a device of the class described, an inlet pipe and a delivery pipe in combination with a chamber, into which said inlet pipe discharges, a passageway connecting said chamber with said delivery pipe, means for injecting water into said chamber under pressure due to the head of water in said delivery pipe, means for injecting water into said passageway under the same head and means for varying the pressure in a portion of said passageway as and for the purpose specified.

4. In a device of the class described, an inlet pipe and a delivery pipe in combination with a passageway connecting said pipes, means for drawing in and injecting water from said inlet pipe into said passageway under pressure due to the head of water in said delivery pipe, a chamber forming a portion of said passageway, valves for closing said chamber when the pressure therein equals the pressure in the other portion of said passageway and means for reducing the pressure in said chamber at such times, substantially as described.

In testimony whereof I have signed my name to this specification in the presence of two subscribing witnesses.

LEOPOLD RUBACH.

Witnesses:
HOWARD S. AUSTIN,
H. F. LILLIS.